E. A. WATTS.
VALVE FOR AIR COMPRESSORS.
APPLICATION FILED JULY 8, 1914.
1,135,476.
Patented Apr. 13, 1915.
2 SHEETS—SHEET 1.
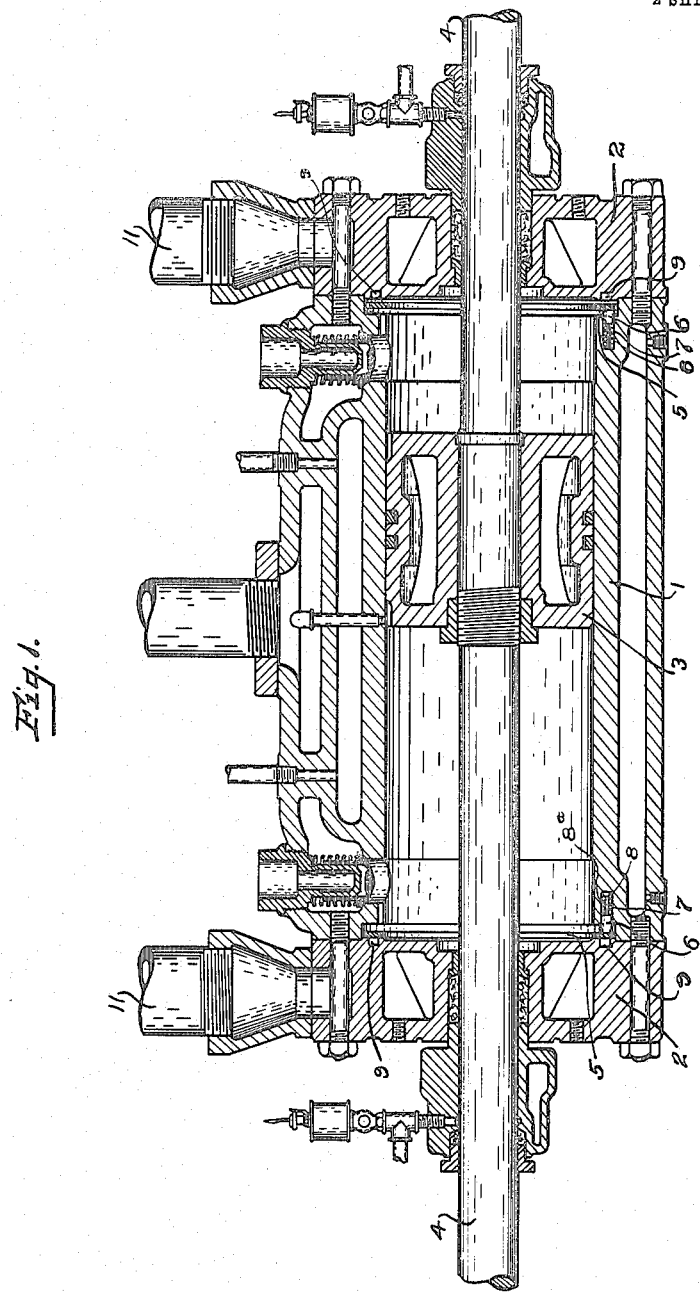

E. A. WATTS.
VALVE FOR AIR COMPRESSORS.
APPLICATION FILED JULY 8, 1914.
1,135,476.
Patented Apr. 13, 1915.
2 SHEETS—SHEET 2.
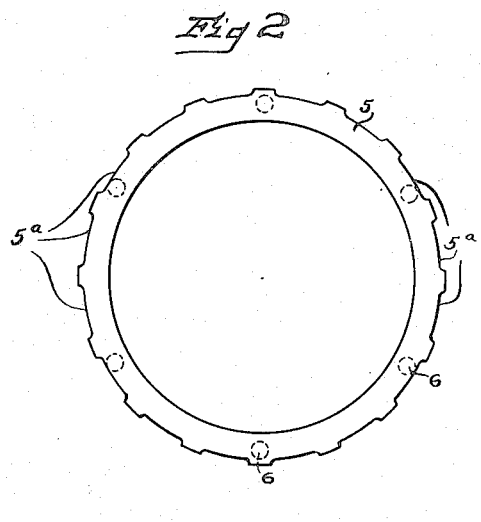
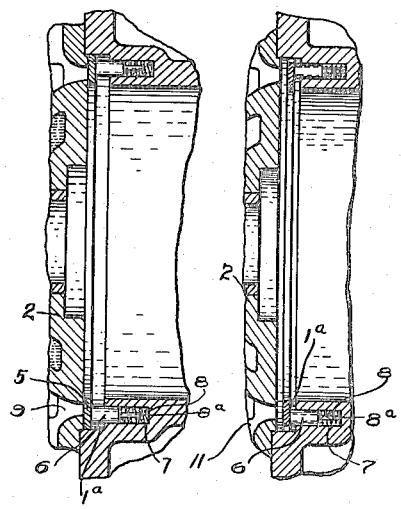
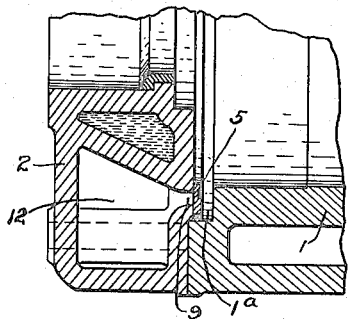
Witnesses
Inventor
Elmer A. Watts
By Staley & Bowman
Attorney

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

VALVE FOR AIR-COMPRESSORS.

1,135,476.  Specification of Letters Patent.  Patented Apr. 13, 1915.

Application filed July 8, 1914. Serial No. 849,704.

*To all whom it may concern:*

Be it known that I, ELMER A. WATTS, a citizen of the United States, residing at Springfield, in the county of Clark and State of Ohio, have invented certain new and useful Improvements in Valves for Air-Compressors, of which the following is a specification.

This improvement relates to an improved air compressor particularly adapted for high pressure work.

The object is to construct a simple and efficient device such that there shall be a most efficient motion of the piston and an improved suction of the air, caused by an improved construction and location of the valve. It is especially adapted for high piston speed and high pressure work.

In the accompanying drawings: Figure 1 is a longitudinal section view, showing the piston moving toward the left hand end of the cylinder. Fig. 2 is a detail view of the valve. Fig. 3 is a longitudinal section of a portion of the devices showing the valve closed. Fig. 4 is a similar view showing the valve open. Fig. 5 is an enlarged detail sectional view of a portion of the valve and inlet.

Like letters of reference indicate like parts in the several views.

The main feature of this improved construction is that the valve is of a simple ring construction and so arranged that there will be an increased port area, while there is maintained the proper clearance between the piston and the heads of the cylinder thereby diminishing any opportunity for air to form in pockets, so as to interfere with the proper action of the piston on its compression stroke. The valve is so arranged that the air can enter both around the notched outer periphery of the valve and also the inner open portion of the valve and by reason of the valve being properly located with reference to the bore of the cylinder the circumference of the valve is much larger than the inner bore of the cylinder, which also increases the port area, and by reason of the fact that the valve is of a flat ring type and is placed at the extreme end of the cylinder there is little or no chance of air forming in any pockets, to interfere with the proper compression of the air.

Referring to Fig. 1, 1 represents the cylinder and 2 the heads thereof; the cylinder and heads being water jacketed in the usual way for cooling purposes. The piston for the cylinder is marked 3 and is connected in the usual and ordinary way to the piston rod 4. Each end of the cylinder is formed with a counterbore or recess 1ª and in each recess is located an open valve ring 5. As shown best in Fig. 2 this valve is notched so as to form a series of ports 5ª on its outer periphery. Secured to this valve are plungers 6, there being preferably shown six of these plungers. The plungers fit into guides formed in the casing of the cylinder 7 and the springs 8 tend to force the valve into its closed position and the plungers 6 and guides 8ª are so proportioned that when the suction of the air tends to open the valve the plunger will contact against the end of the guide 8 and insure the valve being held in a position such that the air can enter around the parts formed on the outer periphery of the valve as well as the opening around the inner periphery of the valve. As shown in Fig. 1, at the right hand end of the cylinder, and also in Fig. 4, on the suction stroke of the piston the valve is moved to a position such that the plungers 6 contact against the inner wall of the guide of the chamber or casing and the valve is thereby held in open position intermediate the head of the cylinder and the inner wall of the cylinder recess 1ª so that the air from the ports 9 formed in the head 2 will pass through the peripheral ports 5ª of the valve ring and also will enter the cylinder through the central opening formed in the valve ring thereby greatly increasing the port area. It is apparent that there is a very slight movement of the valve, and yet a very large port area for the intake of the air, and by the location of the valve as shown in Figs. 1, 3 and 4 such that the circumference of the valve is greater than the inner bore of the cylinder with the guides for the plungers located in the cylinder and by reason of the location of the valve at the extreme ends of the cylinders without any pockets, being of a flat, thin character, there is thereby insured the proper clearance for the piston with little or no possibility of air being held in any part of the valve to interfere with the compression stroke of the piston.

The intakes for the air are indicated by 11 in Fig. 1 which intakes communicate with the chambers 12 formed in the cylinder heads and enters the bore of the cylinder at the ports 9 heretofore referred to.

Having thus described my invention, I claim:

1. In an air pump or compressor, the combination of a piston and cylinder, a valve of greater circumference than the bore of the cylinder and located at the extreme end of the cylinder with port openings for the air at both the outer and inner periphery of the valve, substantially as specified.

2. In an air pump or compressor, the combination of a piston and cylinder, an annular valve of greater circumference than the inner bore of the cylinder having inlets for the air arranged around the outer periphery and also within the inner periphery of the valve, and means for holding the valve in position whereby the air enters around both the outer and inner periphery thereof.

3. In an air pump or compressor, the combination of a piston and cylinder, an annular valve of a flat ring type located at the extreme end of the cylinder, and means for holding the valve in open position such that the air can enter around the outer periphery as well as within the inner periphery.

4. In an air pump or compressor, the combination of a cylinder and piston, an annular flat valve ring of greater circumference than the bore of the cylinder, plungers for the valve and guides formed in the cylinder for such plungers, and ports about the outer periphery of the valve, the plungers and guides being so arranged that the valve will be held in position such that the air will enter through the peripheral ports and also through the inner periphery of the valve.

5. The combination of a cylinder and piston, heads inclosing the ends of the cylinder, each end of the cylinder adjacent the head being counter-bored to form a recess, a valve ring located in each of said recesses, together with springs for holding said valve in closed position against its corresponding head, each of said valve rings being formed with peripheral ports and also with an open center, means for limiting the movement of said ring in opening so as to cause said ring to stand intermediate the ends of said recess when in open position, and ports in said head.

In testimony whereof, I have hereunto set my hand this 2nd day of July, 1914.

ELMER A. WATTS.

Witnesses:
  CHAS. I. WELCH,
  EFFA M. SMITH.